United States Patent [19]

Rosenbaum

[11] Patent Number: 5,460,792

[45] Date of Patent: **\* Oct. 24, 1995**

[54] REMOVAL AND DESTRUCTION OF HALOGENATED ORGANIC AND HYDROCARBON COMPOUNDS WITH POROUS CARBONACEOUS MATERIALS

[75] Inventor: Bruce M. Rosenbaum, Ambler, Pa.

[73] Assignee: Rohm and Haas Company, Philadelphia, Pa.

[\*] Notice: The portion of the term of this patent subsequent to Apr. 4, 2012 has been disclaimed.

[21] Appl. No.: 995,429

[22] Filed: Dec. 23, 1992

[51] Int. Cl.$^6$ .................................................. B01D 53/72
[52] U.S. Cl. ...................... 423/245.3; 588/205; 210/763
[58] Field of Search ...................... 423/210, 245.1, 423/240, DIG. 20, 245.3; 588/205; 502/22, 23; 210/763

[56] References Cited

U.S. PATENT DOCUMENTS

| | | | |
|---|---|---|---|
| 3,386,922 | 6/1968 | Schoeffel et al. | 502/23 |
| 3,453,073 | 7/1969 | Sims | 23/154 |
| 3,989,806 | 11/1976 | Hyatt | 423/502 |
| 3,989,807 | 11/1976 | Johnston | 423/502 |
| 4,040,990 | 8/1977 | Neely | 260/22 R |
| 4,059,677 | 11/1977 | Sare et al. | 423/240 |
| 4,093,703 | 6/1978 | Buecher et al. | 423/245.3 |
| 4,689,054 | 8/1987 | Vara et al. | 55/61 |
| 4,839,331 | 6/1989 | Maroldo et al. | 502/416 |
| 5,149,342 | 9/1992 | Mestemaker et al. | 55/59 |

FOREIGN PATENT DOCUMENTS

| | | |
|---|---|---|
| 317335 | 5/1989 | European Pat. Off. . |
| 525974 | 2/1993 | European Pat. Off. . |
| 280395 | 7/1990 | Germany . |
| 9013352 | 11/1990 | WIPO . |

OTHER PUBLICATIONS

Technical Notes, *Ambersorb Carbonaceous Adsorbents*, Oct. 1990.

Grunewald et al. *J. Mol. Cat.* 60 (1990) pp. 239–253 (no month).

Grunewald et al. *J. Mol. Cat.* 58 (1990) pp. 227–233 (no month).

Chemical Engineering, vol. 99(8), p. 19 (Aug. 1992).

Significance and Treatment of Volatile Organic Compounds in Water Supplies, Lewis Publishers, by Ram, et al., p. 57 (1990) (no month).

Petroleum Derived Carbons, ACS Symposium Series, vol. 303, by O'Grady, et al., pp. 302–309 (1986) (no month).

Introduction to Powder Surface Area, John Wiley & Sons, by S. Lowell (1979) (no month).

*Primary Examiner*—Michael L. Lewis
*Assistant Examiner*—Stuart L. Henderickson
*Attorney, Agent, or Firm*—Thomas J. Howell

[57] ABSTRACT

A process for the removal and destruction of organic compounds in liquid and gaseous streams by complete oxidation of the organic compounds in the presence of a carbonaceous catalyst at temperatures below about 400° C. is disclosed. The process involves removal of organic compounds in a regeneration step from adsorbents containing organic compounds adsorbed thereon, in which the organic compounds have been previously removed from contaminated fluid streams in an adsorption step, and destruction of the contaminants in an oxidative destruction step by contacting the organic compounds with a carbonaceous catalyst in the presence of oxygen. The process involving oxidation catalysts optionally doped with transition metal oxides is particularly useful for the complete destruction of volatile organic chemicals found in contaminated groundwaters.

7 Claims, 1 Drawing Sheet

REMOVAL AND DESTRUCTION OF HALOGENATED ORGANIC AND HYDROCARBON COMPOUNDS WITH POROUS CARBONACEOUS MATERIALS

BACKGROUND OF THE INVENTION

The present invention relates to the oxidation of hydrocarbon compounds and halogenated organic compounds. In particular, the invention relates to methods for the removal and destruction of organic compounds from liquid and gaseous streams by the essentially complete oxidation of halogenated organic and hydrocarbon compounds to carbon dioxide, haloacid and water in the presence of a carbonaceous catalyst.

Halogenated organic compounds are useful for a number of purposes. In most applications of these materials, particularly in their use as solvents, the spent materials are discarded. The production and use of these halogenated organic compounds often result in the generation of unwanted halogenated organic compound byproducts, which represent a waste of both the halogen and organic compounds thereof. The capital investment required for the further processing of spent and unwanted halogenated organic compounds to provide useful materials often exceeds the value of such processing and these unwanted halogenated organic compound byproducts must be discarded.

Hydrocarbon compounds are useful for a number of purposes, in particular, as fuels, solvents, degreasers, cleaning agents, and polymer precursors. The most important source of hydrocarbon compounds is petroleum crude oil, refined into separate hydrocarbon compound fractions by well-known processing techniques. Many uses of hydrocarbon compounds yield contaminated gaseous and liquid streams which must be discarded or processed for reuse. Thus, there are many opportunities for hydrocarbon compounds to escape into the environment.

Processing and storage of these halogenated organic and hydrocarbon compounds often lead to contamination of the environment (such as soil, groundwater or the air) through accidental spills, leaks from processing equipment and evaporative losses, even though the processor or user of the compounds exercises the utmost care in handling the compounds. Because of their solubility in water and, in many cases, their chemical stability, disposal of these organic compounds by releasing them into the atmosphere or flushing them away with water can cause serious pollution, leading to problems arising from the possible carcinogenic and general toxicity of some of the organic compounds.

Typical disposal methods for undesirable halogenated organic and hydrocarbon compounds and their by-products consist primarily of terrestrial burial methods. Additional disposal methods include ocean discharge, open pit burning, venting to the atmosphere and deep-well disposal. However, these methods are known to contaminate soil, ground water and air and are considered hazardous to the environment. In addition, these methods are economically unattractive because the cost of the disposal of the unwanted organic compounds and their byproducts is not diminished by recovery of some materials of significant economic value.

It is desirable, therefore, to remove these halogenated organic and hydrocarbon compounds from the environment, especially from air supplied for breathing to portable air packs, process plant control rooms, "clean rooms" in silicon chip manufacturing plants and other controlled-environment rooms. Methods for eliminating halogenated organic and hydrocarbon compounds from the environment, such as catalytic incinerators, are known in the art.

Incineration of undesirable halogenated organic compounds also has been proposed. U.S. Pat. No. 3,453,073 discloses a process for recovering halogen from halogenated hydrocarbons comprising passing a chlorinated hydrocarbon, water and oxygen over catalysts at elevated temperatures to form oxides of carbon, water, and hydrogen chloride. This process, however, requires elevated temperatures using special equipment that is stable at such high temperatures and resistant to corrosion by the hydrogen chloride and water produced. The production of carcinogenic materials such as dioxin also is a serious impediment to this disposal method.

U.S. Pat. Nos. 3,989,806 and 3,989,807 propose a process for the recovery of chlorine from chlorinated organic compounds which comprises catalytically oxidizing a chlorinated organic compound feed by reaction with oxygen or an oxygen-containing gas at a reaction temperature of below 500° C. and in the presence of a transition metal-containing supported catalyst. The catalytic supports employed in this method include zeolite materials and activated alumina.

Catalytic incineration of undesirable hydrocarbon compounds using a variety of catalysts is also known. The hydrocarbon compounds to be destroyed are removed from a liquid by countercurrent stripping with air, nitrogen, or other gas stream which will carry hydrocarbons. Hydrocarbons are often removed from soil by passing a gas, such as air, through the contaminated soil. The gas containing hydrocarbon vapor then is passed over the catalyst, typically at elevated temperature (significantly above 250° to 300° C.), with residence times sufficient to oxidize the hydrocarbon. In addition to the additional energy cost incurred in heating catalyst, reactants, and inert material carried with the reactants (such as nitrogen with the oxygen in air), such high-temperature methods require that the material of construction of the processing apparatus be capable of resisting the temperature utilized. Further, at higher temperatures, there exists the possibility of producing noxious or deleterious compositions, such as $NO_x$ if nitrogen is present during the oxidation, which are not normally produced at lower temperatures.

A catalyst for complete oxidation of gaseous hydrocarbon mixtures is disclosed in DD 280,395. The catalyst comprises an oxidation component, preferably CuO, and an adsorption component, preferably an aluminosilicate. Processing temperature preferably is 407° to 577° C.

A system for solvent recovery and disposal of contaminants released by regeneration of solvent-laden air adsorbers is disclosed in U.S. Pat. No. 5,149,342. This system involves condensation/cooling of regenerant streams, recovery of the solvent/contaminants by decantation, phase separation, liquid extraction and distillation steps with incineration of unreclaimed contaminants from activated carbon adsorbers.

A system for the removal and disposal of airborne contaminants from paint booths by adsorbing contaminants on activated carbon, regenerating the adsorbent, recovering the regenerant fluid by various separation, purification and distillation steps, and incinerating the contaminants at 700° to 2500° F. is disclosed in U.S. Pat. No. 4,689,054.

A catalytic process which converts volatile organic compounds (VOC) in aqueous waste streams into carbon dioxide and water is disclosed in Chemical Engineering 99 (8), 19 (Aug. 1992). The catalyst disclosed is platinum or palladium on a carbon carrier which is coated with poly(tetrafluoroethylene); the catalyst passes vapors but not liquids.

Adsorbents for hydrocarbon and halogenated organic compounds also are available. Methods for regenerating saturated adsorbents and catalysts used to remove harmful organic compounds from water, soil, or air are known. Typical regeneration methods include steam regeneration, superloading the catalyst and solvent regeneration. The drawback of these methods is that although the adsorbent or catalyst may be regenerated, the steam or solvent effluent stream remains contaminated with the harmful organic compound and must be treated before disposal.

A need exists, therefore, for an environmentally safe method of disposing of halogenated organic and hydrocarbon compounds which does not require extra separation steps that subject the environment to further contamination (such as decanting, liquid/liquid extraction, distillation and the like), which does not expend large amounts of energy (such as the condensing and reheating/revaporizing steps involved in incineration), and which does not require high operating temperatures and special temperature/corrosion resistant materials of construction (such as conventional incinerators operating at about 500°–1000° C.).

The present invention overcomes many of the disadvantages of previous organic compound disposal methods. It is an object of the present invention to provide a process for the removal and destruction of harmful halogenated organic and hydrocarbon compounds in fluid streams which have been contaminated by contact with other contaminated materials (such as soil, water or air), with a minimum number of separation/handling steps in the treatment process, with reduced energy requirements and with relatively low operating temperatures which do not require the use of specialized equipment.

SUMMARY OF THE INVENTION

The present invention provides a process for the destruction of organic compounds which comprises removing organic compounds from an adsorbent containing organic compounds adsorbed thereon by passing a carrier over the adsorbent and transporting the organic compounds out of the adsorbent as an organic-rich carrier stream and then oxidizing the organic compounds by passing the organic-rich carrier stream through one or more reactor vessels comprising contacting the organic compound-rich carrier stream in the presence of excess oxygen, air, or mixtures of steam with air or oxygen with a catalyst comprised of carbonaceous materials having a surface area, pore size, redox activity, acidity and pore volume sufficient to achieve complete oxidation of the organic compounds at a temperature below about 400° C.

In another aspect of the invention a process is provided which comprises an adsorption step wherein a fluid stream is passed through one or more adsorbents to remove organic compounds from the fluid stream, a regeneration step wherein the organic compounds are removed from the adsorbent by passing a carrier over the adsorbent and transporting the organic compounds out of the adsorbent as an organic-rich carrier stream, and an oxidative destruction step wherein the organic-rich carrier stream is passed through one or more reactor vessels comprising contacting the organic-rich carrier stream in the presence of excess oxygen, air, or mixtures of steam with air or oxygen with a catalyst comprised of carbonaceous materials having a surface area, pore size, redox activity, acidity and pore volume sufficient to achieve complete oxidation of the organic compounds at a temperature below about 400° C.

In yet another aspect of the invention, the catalyst may be doped to enhance catalytic activity, in which case, the dopant is selected from the group consisting of acidic redox-active transition metal compounds, metal oxides, metal oxyhalides, precursors which form metal oxide and metal oxyhalide, and blends thereof.

DETAILED DESCRIPTION

The present invention is based on the discovery that carbonaceous adsorbent catalysts are useful in the essentially complete catalytic oxidation of certain organic compounds. Throughout the specification and claims, when the phrase "organic compound" is used alone it shall refer to either halogenated organic or hydrocarbon compounds or mixtures thereof. Complete oxidation of the organic compounds can be realized at relatively mild temperatures in the presence of such catalysts. Optionally, the carbonaceous adsorbents may be used as substrates which may be doped with compound selected from the group consisting of acidic redox-active transition metal compounds, metal oxides, metal oxyhalides, precursors which form metal oxide and metal oxyhalide, and blends thereof, particularly with regard to use for the essentially complete oxidation of hydrocarbon compounds. The catalytic oxidation of the organic compounds is effected by passing a mixture of oxygen and the organic compound over the catalyst. If required, water can be added as one of the reactants as a source of hydrogen, for example, if the particular halogenated organic compound is deficient in hydrogen, to complete the conversion to carbon dioxide and haloacid.

Figure 1:
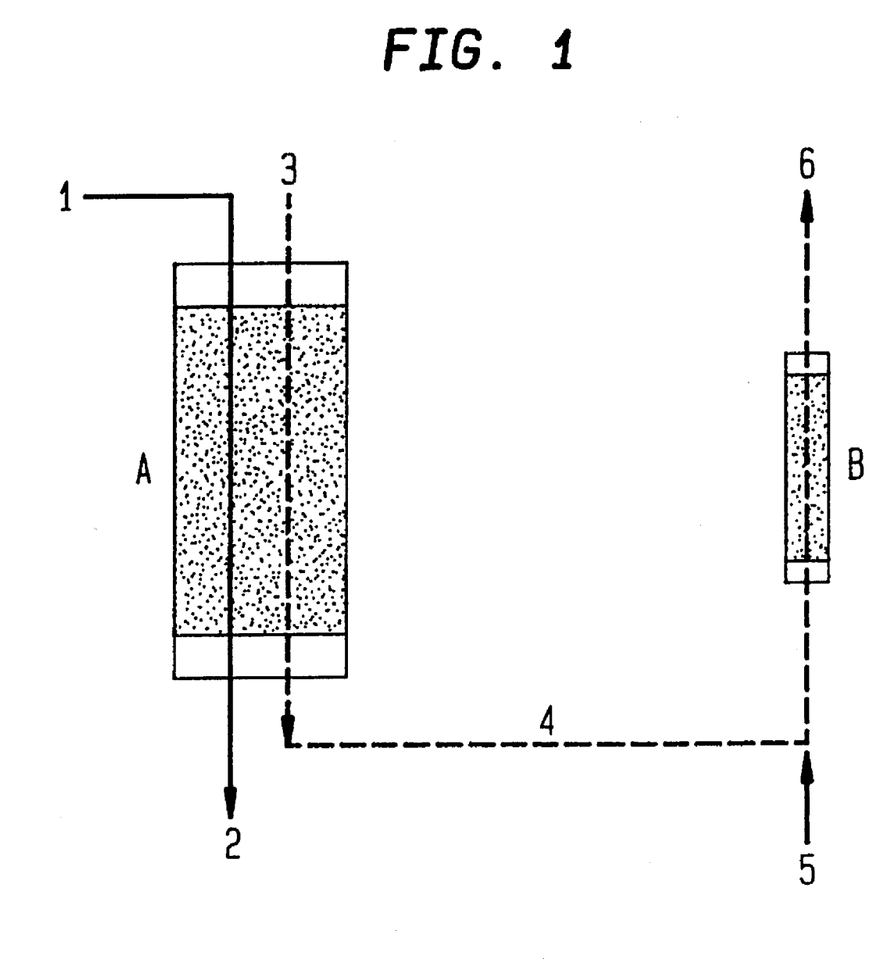

FIG. 1 is a flow diagram which illustrates the basic steps in the process of the present invention. Vessel A represents the adsorption and regeneration steps of the invention. When performing the adsorption step, vessel A contains adsorbent, stream 1 represents a fluid stream containing organic compounds and stream 2 represents an organic-free fluid stream. When performing the regeneration step, stream 3 represents a carrier used to remove adsorbed organic materials from the adsorbent in vessel A and stream 4 represents an organic-rich carrier stream which is directed to vessel B. Vessel B represents the oxidative destruction step of the invention. When performing the oxidative destruction step, vessel B contains a carbonaceous catalyst, stream 5 represents introduction of an oxygen-containing gas and stream 6 represents organic-free carrier effluent together with byproducts of the oxidation reaction, for example, $CO_2$ and water (and haloacid in the case where halogenated organic compounds are involved).

Vessels A and B may be any containers suitable for retaining the adsorbents and catalysts and withstanding the operating conditions of pressure, temperature and chemical environment used. Most often, vessels A and B will be columns constructed of glass, plastic or metal materials which are resistant to the effects of use conditions. The adsorbent may be any material capable of adsorbing and removing substantial quantities of organic compounds from fluid streams. Suitable adsorbents include carbons such as activated carbons; inorganic substrates such as alumina, silica, zeolites, aluminosilicates and the like; organic polymeric adsorbents such as crosslinked polystyrene polymers, in particular macroreticular polymeric adsorbents such as those available from Rohm and Haas Company under the name Amberlite®XAD adsorbents; and carbonaceous adsorbents based on pyrolyzed resinous polymers such as Ambersorb® carbonaceous adsorbents, also available from the Rohm and Haas Company.

The adsorption step as represented by vessel A can include one or more adsorbers arranged either in series or in parallel depending upon the quantity of fluid stream to be treated and other factors such as economic considerations. The adsorption step can also involve upflow or downflow adsorption, and the use of fixed-, rotary- or fluid-bed adsorbers. The oxidative destruction step as represented by vessel B can include one or more catalyst reactors arranged either in series or in parallel depending upon the quantity of organic compounds to be destroyed and other factors such as economic considerations.

Stream 1 is a fluid stream comprised of a carrier containing organic compound contaminants. The carrier may be any gaseous or liquid material which is capable of being contaminated by dissolution or entrainment with organic compounds. Suitable carriers are water and aqueous-based liquids, organic solvents, gases such as air, nitrogen, carbon dioxide and the like. Preferably, the carrier is water or air.

Stream 3 is a carrier used to regenerate the loaded adsorbent in vessel A after having contacted the adsorbent with stream 1. Suitable carriers are steam; organic solvents such as polar solvents, for example, methanol, acetone, dimethylformamide and the like; gases such as air, nitrogen, carbon dioxide, supercritical fluids, inert gases, various Freon™ fluorocarbons and the like. The carrier should be capable of displacing substantial amounts of any adsorbed organic compounds for the adsorbent in vessel A. Preferably, the carrier used to regenerate the adsorbent is steam or a polar organic solvent. The adsorbent is preferably regenerated when environmental limits of the organic compounds, especially EPA-controlled materials, are reached in the effluent (stream 2) from the adsorption step (vessel A).

In cases where stream 4 does not contain steam and the organic compound contaminants include hydrogen-deficient halogenated organic compounds, additional water in the form of steam can be injected with stream 5 to assure complete oxidation of the halogenated organic compounds. Stream 5 is any oxygen-containing gas and includes oxygen, air, oxygen-nitrogen mixtures and the like. Preferably, the oxygen-containing gas is air.

In one embodiment of the invention the catalyst is saturated with organic compounds, for example, by adsorbing organic compounds from a condensed organic-rich carrier stream (from regeneration of the adsorbent in the adsorption step) which is passed through the catalyst at ambient temperature in the absence of oxygen. The saturated catalyst is then heated to oxidation reaction temperature while passing oxygen, air, or mixtures of steam with oxygen or air. The doped catalysts of the present invention also have the ability to adsorb organic compounds at ordinary temperatures, normally near room temperature.

Throughout the specification and claims, the phrase "halogenated organic compound," when used to describe a reactant to be oxidized in accordance with the method of the invention, means any compound susceptible to oxidation and which consists essentially of carbon, hydrogen and halide. Any halogenated organic compound can be oxidized according to the present invention including aliphatic halides as well as aromatic halides. Other halogenated organic compounds which can be oxidized include those compounds containing a component functional moiety where one of the hydrogens of the organic compound is substituted by an atom or functional moiety other than the halide. These functional moieties include any functional group to which a halogenated organic compound can be attached.

More specifically, the halogenated organic compound can be selected from the group consisting of $CH_2Cl_2$, $CH_2Br_2$, $CH_2BrCl$, $CHCl_3$, $CHBrCl_2$, $CHBr_2Cl$, $C_2H_3Cl_3$ (all isomers), $C_2Cl_4$, 1,2-dichloroethylene, 1,1-dichloroethylene, 1,2-dichloroethane, 1,1-dichloroethane, 1,1,2-trichloroethane, methylchloroform, 1,1,2,2-tetrachloroethane (and other isomers), trichloroethylene, $CCl_4$, $CHBr_3$, chlorinated benzenes, polybrominated and polychlorinated biphenyls, chlorinated pesticides such as dieldrin $(C_{12}H_8Cl_6O)$, endrin $(C_{12}H_8Cl_6O)$, aldrin $(C_{12}H_8Cl_6)$, chlordane, bis(chlorophenyl)dichloroethane (DDD), bis(chlorophenyl)trichloroethane (DDT), $CH_2ClOC_2H_5$, $ClCH_2SC_2H_5$, $(ClC_2H_4)_2S$, chlorophenols, and dioxin. Halogenated organic compounds such as $CH_2Cl_2$, $C_2H_2Cl_4$, $C_2H_4Cl_2$, $CH_2Br_2$, perchloroethylene, trichloroethylene and trichlorobenzene are of particular interest.

Throughout the specification and claims, the phrase "hydrocarbon compound," when used to describe a reactant to be oxidized in accordance with the method of the invention, means any compound susceptible to oxidation which consists of carbon and hydrogen. In particular, hydrocarbon compounds which can be oxidized according to the present invention include aromatics and aliphatic and alicyclic alkanes, alkenes and alkynes. Thus, aromatic compounds and linear, branched, and cyclic alkane, alkene, and alkyne compounds can be oxidized in accordance with the process of the invention.

More specifically, the hydrocarbon compound can be selected from the group consisting of aliphatic alkanes, such as methane, ethane, propane, butanes, pentanes, methyl butanes, ethyl propane, and hexanes; alicyclic alkanes, such as cyclopropane, cyclobutane, cyclopentane, cyclohexane, methylcyclopentane, and dimethylcyclopentanes, and other alkanes having up to about 30 carbon atoms; aliphatic alkenes, including dienes, trienes, and tetraenes, such as ethene, propene, butene, 1- and 2-pentene, and hexenes; alicyclic alkenes, such as cyclopropene, cyclobutenes, cyclopentenes, and cyclohexenes; cyclobutadienes, cyclopentadienes, cycloheptatrienes, and cyclooctatetrene; and other alkenes having up to about 30 carbon atoms and at least 1 double bond; aliphatic alkynes, including those having 1 or more triple bonds, such as acetylene, propyne, butynes, pentynes, and hexynes; 2,4,6-octatriyne; and other alkynes having up to about 30 carbon atoms and at least 1 triple bond; and aromatics, such as benzene and benzene substituted with alkanes, such as toluene, ethylbenzene, and the xylenes; benzene substituted with alkenes, such as styrene and α-methylstyrene.

A particular group of halogenated organic and hydrocarbon compounds is also known as "volatile organic chemicals (compounds)," hereinafter referred to as VOC, and is generally recognized to include those organic compounds with relatively high volatility and relatively low water solubility, although other, more narrow, definitions have been used by drinking water regulatory agencies depending upon the analytical methods used (*Significance and Treatment of Volatile Organic Compounds in Water Supplies*, N. M. Ram, R. F. Christman and K. P. Cantor, p 57, Lewis Publishers, 1990).

Among the VOC which are of importance in the treatment of fluid streams by the process of the present invention are aliphatic and aromatic hydrocarbons and their corresponding halogenated analogues (listed in greater detail in the sections on halogenated organic and hydrocarbon compounds elsewhere in the specification), e.g., pentanes, hexanes, heptanes, octanes, and the like and corresponding unsaturated derivatives; benzene, toluene, xylenes, alkylated benzenes, naphthalene and alkylated naphthalenes, styrene, vinyltoluene; chloro- and bromo-substituted derivatives of the aforementioned alkanes, alkenes and aromatic hydrocarbons, such as chlorobenzene, brombenzene, chloronaphthalene and the like. Also of particular interest are polyhalogenated derivatives of the aforementioned aliphatic and aromatic hydrocarbons, e.g., carbon tetrachloride, chloroform, dichloroethanes, dichloropropanes, dichloromethane, dichloroethylenes, trichloroethylenes, trichloroethanes, dibromoethanes, dichlorobenzene and the like.

A specific group of hydrocarbon compound VOC which is of particular interest with regard to treatment of groundwater by the process of the present invention is known as "BTEX," which is a mixture of benzene, toluene, ethylbenzene and xylenes (all isomers).

The following discussions will treat the oxidation of halogenated organic compounds and hydrocarbon compounds separately for the sake of clarity, but it will be understood to the skilled practitioner in the art that when mixtures of halogenated organic and hydrocarbon compounds are oxidized that stoichiometric relationships for oxidation of the individual types of organic compounds will apply.

Specific aliphatic halogenated hydrocarbons of the present invention correspond to the formula $C_nH_mX_p$; wherein n is a whole number, preferably from 1 to 10 inclusive, more preferably no more than 5, and most preferably no more than 3; p is a whole number from 1 to (2n+2) inclusive; m is represented by (2n-p+2), is a whole number from 0 to (2n-p+2) inclusive; and X represents any halide, preferably chlorine and bromine, and most preferably chlorine. The stoichiometric quantities of oxygen, carbon dioxide and haloacid can then be calculated from the following formula for the reaction:

$$C_nH_mX_p + (p-n-1)H_2O + \tfrac{1}{2}(3n-p+1)O_2 \rightarrow nCO_2 + pHX$$

When the molar ratio of halide to hydrogen is less than 1, i.e., p is less than m, it can be seen that water will be produced by the above equation due to the negative sign before the $H_2O$. Alternatively, when the molar ratio of halide to hydrogen is greater than 1, i.e., p is greater than m and the organic compound is deficient in hydrogen, additional hydrogen must be supplied through the addition of water as would be shown by a positive integer before $H_2O$ in the above equation.

The following examples will illustrate the above relationship in more detail. If the halogenated organic compound $C_2H_4Cl_2$ were oxidized, p would be less than m and water would be produced. In the above compound, n=2, p=2, and m=(2n-p+2)=4. The stoichiometric amount of $H_2O$ would then be p-n-1 or -1. This would indicate that one mole of $H_2O$ would be produced. On the other hand if the halogenated organic compound $CHCl_3$ were oxidized, p would be greater than m and water would be a reactant. In the compound $CHCl_3$, n=1, p=3, and m=(2n-p+2)=1. The stoichiometric amount of $H_2O$ would then be (p-n-1) or +1. Thus, water would be a reactant.

The amount of water required to complete the conversion of a hydrogen-deficient halogenated organic compound must be at least stoichiometrically sufficient to oxidize all of the available carbon content to carbon dioxide and to convert all of the halogen and hydrogen content of the halogenated organic compound to haloacid (HX). Generally, the amount of water actually utilized will be far in excess of the stoichiometric amount required to ensure complete oxidation of the hydrogen-deficient halogenated organic compound. In accordance with the guidelines provided herein, the skilled practitioner in the art will be able to vary the amounts and sources of the water.

Specific hydrocarbon compounds which undergo essentially complete oxidation in accordance with the process of the present invention are alkanes which correspond to the formula $C_nH_{2(n+1-r)}$, wherein n is a whole number up to about 30, preferably from 1 to about 20 inclusive, more preferably no more than about 10, and most preferably no more than about 8; and r is a whole number equal to the number of rings in the compound; alkenes which correspond to the formula $C_mH_{2(m+1-r-d)}$, wherein m is a whole number up to about 30, preferably from 2 to about 20 inclusive, more preferably no more than about 10, and most preferably no more than about 6; r is as defined above; and d is a whole number equal to the number of double bonds in the compound; alkynes which correspond to the formula $C_pH_{2(p+1-2t-r)}$, wherein p is a whole number up to about 30, preferably from 2 to about 12 inclusive, more preferably no more than about 8, and most preferably no more than about 6; r is as defined above; and t is a whole number equal the number of triple bonds in the compound; compositions having both double and triple bonds, such as 1-cyclodecene-4-yne ($C_{10}H_{14}$); and aromatics which correspond to the formula wherein $R_1$, $R_2$, and $R_3$ may be the same or different, and wherein each of $R_1$, $R_2$, and $R_3$ independently is selected from the group consisting of H, aliphatic (linear and branched) and alicyclic alkyl, alkylene, and alkyne hydrocarbons and aryl hydrocarbons having up to about 20 carbon atoms. Skilled practitioners recognize that in no event can the number of hydrogen atoms in a hydrocarbon compound be negative.

The stoichiometric quantities of oxygen required and carbon dioxide produced can be calculated from the following formulae:

1. When the hydrocarbon compound is an alkane:

$$C_nH_{2(n+1-r)} + \tfrac{1}{2}(3n+1-r)O_2 \rightarrow n\,CO_2 + (n+1-r)H_2O$$

2. When the hydrocarbon compound is an alkene:

$$C_mH_{2(m+1-r-d)} + \tfrac{1}{2}(3m+1-r-d)O_2 \rightarrow m\,CO_2 + (m+1-r-d)H_2O$$

3. When the hydrocarbon compound is an alkyne:

$$C_pH_{2(p+1-2t-r)} + \tfrac{1}{2}(3p+1-2t-r)O_2 \rightarrow p\,CO_2 + (p+1-2t-r)H_2O$$

4. When the hydrocarbon compound is an aromatic, or contains at least 1 double bond and at least 1 triple bond, skilled practitioners can solve the stoichiometric equation. For example, for toluene, the equation would be as follows:

$$C_6H_5CH_3 + 9O_2 \rightarrow 7CO_2 + 4H_2O$$

For 1-cyclodecen-4-yne, the equation would be as follows:

$$C_{10}H_{14} + 13\tfrac{1}{2}O_2 \rightarrow 10CO_2 + 7H_2O$$

The organic compounds of interest in the present invention undergo essentially complete oxidation to carbon dioxide and water (and HX when halogenated organic compounds are involved). The expression "complete oxidation" means at least 70% by weight of the organic compound has been oxidized. Preferably 80% by weight, more preferably 90% by weight, and most preferably at least about 99% by weight of the organic compound has been converted. To ensure complete oxidation, excess oxygen is required. The amount of oxygen used in the oxidation of the organic compound in accordance with the present process should be in an amount that is sufficient to oxidize the specific quantity of organic compound contained in the supply stream. In the case of hydrocarbon compounds, the amount of oxygen should be at least stoichiometrically sufficient to oxidize substantially all of the carbon and hydrogen content of the hydrocarbon compound to carbon dioxide and water, respectively. In the case of halogenated organic compounds, the amount of oxygen should be at least stoichiometrically sufficient to oxidize substantially all of the carbon content of the halogenated compound to carbon dioxide, and when the molar ratio of halogen to hydrogen in the hydrocarbon is less than 1, the amount of oxygen preferably is sufficient to oxidize both the carbon content and available hydrogen content of the halogenated hydrocarbon to carbon dioxide and water, respectively. The available hydrogen content is the hydrogen remaining after the hydrogen and halide have reacted to form the haloacid. Relative flow rates and contact times can be adjusted to accommodate different organic compound feed rates and reaction temperatures.

Often, mixtures of hydrocarbon compounds are oxidized in accordance with the process of the invention, such as mixtures of alkanes, alkenes, alkynes, and aromatic compounds. For example, motor gasoline, diesel fuels, and jet fuels are mixtures comprising hydrocarbon compounds which can be oxidized in accordance with the process of the invention. Kerosine and mineral oils are additional examples of such hydrocarbon mixtures. Many such products known in the marketplace can be oxidized in accordance with the process of the invention.

Another source of mixtures of hydrocarbon compounds which are oxidizable in accordance with the process of the invention is the product stream resulting from the thermal or catalytic cracking of heavy hydrocarbons. Thus, hydrocarbon compounds of low volatility can be cracked, in the presence of cracking catalyst or by a thermal method, to form more volatile hydrocarbon compounds, which then can be oxidized in accordance with the process of the invention.

Oxidation of hydrocarbon compounds in accordance with the process of the invention would be particularly useful, for example, in a crude oil refining plant to ensure not only that essentially no hydrocarbon compound pollutes the environment, but also that air supplied to control rooms, for example, is free of hydrocarbons. Not only does this improve the working environment for refinery personnel, but also reduces the chances of fire and explosion on the refinery site.

Generally, the amount of oxygen used will be far in excess of the stoichiometric amounts required to ensure essentially complete oxidative decomposition of the organic compounds. The amount of excess oxygen used can vary provided that sufficient quantities are made available to accomplish the aforesaid described degree of oxidation. The oxygen can be provided by utilizing air, oxygen, or oxygen-enriched air. The oxygen-containing stream also can be mixed with steam. In the case of halogenated organic compounds, one advantage of using steam is to recover the haloacid in an aqueous solution.

Selected hydrocarbon compounds, for example phenanthrene and other higher molecular weight hydrocarbon compounds, may be resistant to oxidation in accordance with the process of the invention. Therefore, although it is possible (typically by recycling incompletely oxidized hydrocarbon compound) to effect essentially complete oxidation of such compounds in accordance with the process of the invention, a supplemental oxidant can be utilized to accelerate the oxidation of such hydrocarbon compounds. Suitable supplemental oxidants include hydrogen peroxide ($H_2O_2$) and nitrogen dioxide ($NO_2$). Such supplemental oxidants are optional additives to the practice of the process of the invention.

The carbonaceous catalysts and the carbonaceous substrates of the catalysts to be employed in the process of this invention comprise any form of carbon which catalyzes essentially complete oxidation of the organic compounds. In the case of a halogenated organic compounds, any form of carbon which catalyzes the oxidation to carbon dioxide, water and a haloacid is acceptable. In the case of hydrocarbon compounds any form of carbon which catalyzes the oxidation to carbon dioxide and water is acceptable. Thus, carbon derived from any animal, plant or mineral source can be used. Examples of suitable carbon catalysts include, but are not limited to, the following: activated carbons such as those derived from coal, wood, coconut shells, lignin or animal bones; carbon blacks such as those derived from gas phase pyrolysis of hydrocarbons; natural or synthetic graphites or graphite whiskers; supported pyrolytic carbons wherein the support is an inorganic refractory oxide, inorganic phosphate, inorganic boride, or inorganic nitride; cokes such as those obtained from the destructive distillation of bituminous coal, petroleum, and coal-tar pitch; and chars and polymeric carbons prepared by pyrolysis of resinous polymers. Additionally, it is acceptable to employ high surface area carbons prepared by direct chemical activation. Such chemically activated, high surface area carbons are described by T. M. O'Grady and A. N. Wennerberg in *Petroleum Derived Carbons,* American Chemical Society Symposium Series, Vol. 303, J. D. Bacha et al., eds., American Chemical Society Publications, Washington, D.C., 1986. The preparation of these high surface area carbons involves reacting petroleum coke or other carbonaceous sources with excess potassium hydroxide at about 450° C. to obtain an intermediate product which is subsequently pyrolyzed at about 850° C. to the high surface area carbon.

Some of the above-identified carbons, for example the activated carbons and graphites, are "soft" carbons which are known to break apart easily and slough dust particles. Others of the above-identified carbons are non-graphitizable or "hard" carbons, which are known to possess good structural integrity and do not slough dust particles. The carbons prepared by the pyrolysis of resinous polymers are an example of hard carbons. Preferably, the catalysts and catalyst substrates employed in the process of this invention are hard carbons. More preferably, the catalyst and catalyst substrate employed in the process of this invention is a hard carbon prepared by the pyrolysis of a resinous polymer.

The hard carbon catalysts and catalyst substrates which are prepared by the pyrolysis of resinous polymers are known in the art. The catalysts and catalyst substrates and their method of preparation are described in U.S. Pat. No. 4,040,990, which is incorporated herein by reference. As described therein, these carbons are partially pyrolyzed particles preferably in the form of hard beads or spheres. They are produced by the controlled decomposition of a synthetic polymer. The pyrolysis, as described in U.S. Pat. No. 4,040,990, is generally conducted in an inert atmosphere comprised of, for example, helium, argon, or nitrogen. Preferably, the polymer is heated rapidly to a maximum temperature in the range from about 300° C. to about 900° C.; heated at the maximum temperature for a period of up to about 20 minutes; and cooled to room temperature before exposing to air. For the purposes of this invention, maximum temperatures of up to about 1200° C. are also suitable, and longer heating times are not deleterious.

Any of the many synthetic polymers disclosed in U.S. Pat. No. 4,040,990 and incorporated herein by reference, can be employed in preparing the hard carbon catalyst and catalyst substrates for the process of this invention. Preferred are polymers derived from aliphatic and aromatic materials which are ethylenically unsaturated. Preferably, the polymer is crosslinked, because crosslinking stabilizes the polymer thermally and leads to greater carbon yields. Preferably also, the polymer contains a carbon-fixing moiety, such as a cation, anion, strong base, weak base, sulfonic acid, carboxylic acid, halogen, or alkylamine moiety. The more preferred polymers include polyvinylidene chloride, and macroreticular ion exchange resins derived from aliphatic and aromatic materials which are ethylenically unsaturated. Most preferably, the polymer is a polystyrene divinylbenzene sulfonic acid ion exchange resin. In addition to the polymers disclosed in U.S. Pat. No. 4,040,990, any of the polysulfonated polymers disclosed in U.S. Pat. No. 4,839,331, and incorporated herein by reference, can be employed in preparing the hard carbon catalyst and catalyst substrates for the process of the invention.

As described in U.S. Pat. No. 4,839,331, carbonaceous materials also can be activated by heating in an activating atmosphere. Suitable activating gases include oxygen, steam, water, ammonia, carbon monoxide, and carbon dioxide. Such activated materials are preferred catalysts in the practice of the method of the invention.

Catalyst produced by pyrolyzing resinous materials also includes pyrolyzed polyacrylonitrile (PPAN). PPAN can be prepared in accordance with any method which yields material having the desired specific surface area and pore distributions. In particular, the polyacrylonitrile (PAN) preferably is crosslinked to provide superior pyrolyzed material. In one suitable two-step process, preliminary oxidation is carried out by heating PAN in air for up to about 24 hours at a temperature of between about 150° and 300° C. In the second step, the pre-oxidized material is carbonized by heating to a temperature between 500° and 1200° C. in an inert atmosphere. If desired, a third (activation) step may be carried out. The material is heated to a temperature above about 600° C. in an oxidizing atmosphere. Activation increases the specific surface area of the material, thus increasing its activity. The preferred hard carbon catalysts or catalyst substrates, which are prepared by the pyrolysis of resinous polymers, contain at least three distinct sets of pores of differing average size. One set comprises large pores, macropores, which originate from the resinous starting material, and typically range in size of at least 500 angstroms in average diameter. The second set comprises intermediate pores, mesopores, which typically range in size from about 20 angstroms to about 500 angstroms. The third set and smallest pores, micropores, originate on pyrolysis of the resinous polymer. These small pores are typically less than about 20 angstroms in average diameter; however, the exact size depends on the temperature of pyrolysis. In addition to pore size, the pyrolysis temperature also controls total pore volumes. Generally, as the pyrolysis temperature increases, the micropore volume increases. However, at pyrolysis temperatures about 900° C., the micropore volume is low. It is believed that the micropores control the product selectivities in the deep oxidation reaction; however, such a theory should not be construed to be binding or limiting of the scope of the invention.

The macropore volume of the carbon catalyst or catalyst substrate of this invention should be at least 0.10 milliliters per gram (ml/g); preferably in the range from about 0.10 ml/g to about 0.35 ml/g; more preferably in the range from about 0.15 ml/g to about 0.30 ml/g; and most preferably in the range from about 0.20 ml/g to about 0.25 ml/g. The mesopore volume of the carbon catalyst or catalyst substrate of the present invention is typically in the range from about 0.05 ml/g to about 0.30 ml/g; preferably in the range from about 0.10 ml/g to about 0.20 ml/g; and most preferably in the range from about 0.12 ml/g to about 0.18 ml/g. The micropore volume of the pyrolyzed carbon substrate of this invention is at least about 0.10 ml/g. More preferably, the micropore volume of the pyrolyzed carbon catalyst or catalyst substrate of this invention is in the range from about 0.15 ml/g to about 0.35 ml/g; most preferably in the range from about 0.18 ml/g to about 0.32 ml/g.

Catalysts which are carbonaceous materials produced in accordance with the method of U.S. Pat. Nos. 4,040,990 and 4,839,331 are available from the Rohm and Haas Company under the tradename Ambersorb®carbonaceous adsorbent. The Ambersorb®carbonaceous adsorbents are hard, non-dusting spheres with selected specific surface areas and selected pore distribution, as those terms are defined herein. In particular, Ambersorb®carbonaceous adsorbents sold under the identifications 348F, 563, 564, 572, and 575 are particularly preferred in the practice of the method of the invention.

Ambersorb®carbonaceous adsorbent is prepared in either activated or unactivated form. Unactivated material is hydrophobic and non-polar, and exhibit a pore size distribution having less microporosity than activated material. For example, Ambersorb®carbonaceous adsorbent 563 and 564 are unactivated, and have less than about 0.3 ml/g microporosity. Activated Ambersorb®carbonaceous adsorbent, such as the product identified as 572 or 575, is significantly less hydrophobic than unactivated material and exhibits polar characteristics (contributed by the oxygen-containing surface functionality imparted by activation). Importantly, the microporosity exceeds 0.30 ml/g. Also, the specific surface area of activated material typically is higher than that of unactivated material.

The measurement of porosity is derived from surface area and pore volume measurements obtained on any suitable instrument, such as a Micromeritics DIGISORB®2500 unit, using nitrogen as the adsorbate at the boiling point of nitrogen, 77° K. The porosity of the carbon catalyst or catalyst substrate of the present invention is a function of the pyrolysis conditions, the activation of the catalyst or catalyst substrate and the porosity of the initial copolymer used to make the catalyst. The methods used to obtain surface area and pore volumes are described by S. Lowell in *Introduction to Powder Surface Area* (John Wiley & Sons, 1979), or in the manuals provided with the DIGISORB®2500 instrument made by the Micromeritics Instrument Corporation.

The carbonaceous catalysts and catalyst substrates of this invention can possess any surface area provided the catalyst or catalyst substrate is active in the oxidative destruction reaction. Generally, the carbonaceous catalyst possesses a surface area of at least about 10 square meters per gram ($m^2/g$). Preferably, the carbon catalyst possesses a surface area in the range from about 100 m²/g to about 2000 m²/g; more preferably, in the range from about 400 m²/g to about 1500 m²/g; most preferably in the range from about 600 m²/g to about 900 m²/g. Doped catalysts which do not have the preferred pore size distributions described previously typically have higher specific surface areas. For example, carbon molecular sieve materials typically have a specific surface area of at least about 2000 m²/gram. Typically, higher specific surface area yields greater activity. The surface area is measured by the Brunauer-Emmett-Teller (BET) method. The BET method is described by R. B. Anderson, in *Experimental Methods in Catalytic Research*, Academic Press, 1968, pp. 48–66.

The catalysts of the present invention also can possess a variety of pore volumes, pore sizes, and surface areas provided the catalysts are effective in completely oxidizing the organic compounds. The above-mentioned surface areas, pore sizes, and pore volumes are particularly preferred for the particular pyrolyzed hard carbon catalysts used in the oxidation of the organic compounds. As long as the pore volume, pore size, and surface area of the catalyst are effective in completely oxidizing the organic compounds, the particular source of carbon is not limited provided only that the carbon catalyst or catalyst substrate can be formed having the effective parameters. The pore volume, pore size, and surface area of the catalysts of the present invention can be altered by modifying the catalyst or catalyst substrate formation conditions. For example, the temperature of pyrolysis as well as the pore volume of the initial copolymer can be adjusted to bring the pyrolyzed catalyst or pyrolyzed catalyst substrate to within the desired range. The skilled practitioner in the art will appreciate other known methods of modifying the parameters of the carbon catalyst in order to achieve the complete oxidation of the selected organic compounds.

Although the inventors do not wish to be bound by any theory, it is believed that the activity of the catalyst is related to not only the pore size, pore volume and surface area, but also to the redox activity and acidity of active sites and to interactions involving the redox activity and acidity of active sites of the substrate with the redox or Lewis acid activity of metal oxides, metal oxyhalides, precursors which form metal oxide and metal oxyhalide, and the like, which may be used as dopants, within the pores of the catalyst. For example, washing the catalyst with dilute base substantially decreases the activity of the catalyst without changing the pore volume. Again, the inventors do not wish to be bound by theory, but it is believed that, when dopants are used, the substrate may undergo redox reactions with the dopant, or it may disperse dopant, especially metal oxide, thus providing a large surface area for catalysis, without reacting with either dopant or organic compound. The skilled practitioner will appreciate other known methods of modifying the redox activity and acidity of the catalyst. Accordingly, all parameters of the catalyst must be accounted for by the skilled practitioner in the art when selecting the appropriate catalyst useful for the complete oxidation of the selected organic compounds.

A wide variety of metal oxides, metal oxyhalides, metal oxide precursor compounds, and metal oxyhalide precursor compounds can be employed as dopants. Skilled practitioners recognize that a metal oxide precursor compound or a metal oxyhalide precursor compound can be utilized to provide the desired quantity of metal oxide or metal oxyhalide dopant, respectively. Such compounds typically are called dopant precursors. Typically, the dopants and precursor compounds are volatile or are soluble in solvents that disperse the compound over and into the pores of the carbonaceous substrate.

Such compounds may be active in the form added, or may be active as the oxide, hydroxide, or oxyhalide (typically, formed upon hydrolysis or decomposition). The halide is selected from the group consisting of fluoride, chloride, bromide, iodide, and blends thereof; preferably, the halide moiety is chloride. In particular, dopants are metal oxides and oxyhalides of the first row transition metals (Sc, Ti, V, Cr, Mn, Fe, Co, Ni, and Cu), zinc, tin, lead, niobium, zirconium, molybdenum, and related redox-active elements. Precursors which form the metal oxide or metal oxyhalide, typically by hydrolysis or decomposition, are compounds such as the nitrate, sulfate, carbonate, or other soluble salts of these metal oxides and metal oxyhalides. Particularly preferred dopants include $CrO_3$, $TiO_2$, $MnO$, $CoO$, $V_2O_5$, $FeO$, and $ZnO$. Preferred dopant precursors include $Ce(NO_3)_3$, $Cu(NO_3)_2$, $KMnO_4$, $Zn(NO_3)_2$, $Co(NO_3)_2$, and $Mn(NO_3)_2$, and the analogous sulfates and carbonates.

When the carbonaceous catalyst of the present invention is used for the oxidation of halogenated organic compounds it may be doped with an acidic, redox-active metal compound to enhance activity. A wide variety of acidic, redox-active metal compounds can be employed as dopants. Typically, the compounds are volatile, or soluble in solvents that disperse the compound over the carbonaceous material. Such compounds may be active in the form added, or may be active as the oxide, hydroxide or oxychloride formed upon hydrolysis. Particularly preferred dopants include $CrO_3$, $TiO_2$, $Ce(NO_3)_3$ and $KMnO_4$.

When the carbonaceous catalyst of the present invention is used for the oxidation of hydrocarbon compounds it preferably comprises carbonaceous substrates doped with a compound selected from the group consisting of metal oxides, metal oxyhalides, precursors which form metal oxide and metal oxyhalide, and blends thereof, previously described.

The process of the present invention is carried out at mild reaction conditions at temperatures sufficient to complete the oxidation reaction. When the organic compounds are substantially hydrocarbon compounds, the catalyst is preferably a doped carbonaceous catalyst and the reaction temperature is less than about 300° C., preferably between about 150° and about 250° C., and more preferably between about 175° and about 230° C. When the organic compounds are substantially halogenated organic compounds, the catalyst is preferably an undoped carbonaceous catalyst and the reaction temperature is less than about 400° C., preferably less than about 300° C., more preferably less than 275° C., and most preferably about 250° C.

Catalysts and catalytic oxidation processes which are useful in carrying out the process of the present invention are the subject of co-pending U.S. patent applications Ser. Nos. 721,763, filed Jun. 28, 1991 and 938,769, filed Sep. 3, 1992, assigned to the assignee hereof, and which are incorporated herein by reference.

The particular flow rates of reactants, temperatures and pressures of the reaction, and residence time of reactants in the reactor all vary depending upon the particular organic compound. For example, residence times in the reactor can range from about 0.1 second to about 10 minutes, preferably from about 0.1 to about 2 minutes, and more preferably from about 0.5 seconds to about 1 minute. Those organic compounds which decompose or oxidize less readily may require slower feed rates, additional oxygen and longer residence times. It is also difficult to accurately predict the operating capacities of a particular catalyst for a multicomponent system without results from an actual column study. Static adsorption isotherm data can be used to approximate the weight or volume of an adsorbent required at a given contaminant concentration level. Flow rate constraints can then be used to estimate how long the column can remain in service. The particular type of reactor also varies with the organic compound oxidized. Generally, the catalyst reactor can be a standard fluid or fixed bed reactor designed to withstand the acidic products and reactants. The skilled practitioner in the art appreciates the manner in which these process condition and parameters can be modified.

Although operating conditions can be selected in practicing the present invention to preserve catalyst lifetime and activity, the catalysts may require regeneration after extensive use, such as when reduced catalytic activity is observed. The catalysts can be regenerated when needed for essentially complete restoration of catalytic activity. Although the inventors do not wish to be bound by theory, it is believed that regeneration not only removes deleterious deposits from the catalyst by oxidation, sublimation, and related processes, but also reoxidizes any reduced metal oxide that may be present from use of dopants. Catalyst regeneration is carried out by passing an oxygen-containing gas over the catalyst in the absence of organic compound reactant in the feed stream at a temperature and for a time period sufficient for essentially complete removal of deleterious deposits from the catalyst and restoration of the activity thereto. Temperatures between about 200° and 300° C., and time periods of up to about 48 hours, are normally sufficient for essentially complete restoration of catalytic activity. A regeneration temperature higher than 300° C., for example, 350° C., can be utilized, but the time period the catalyst is exposed to such higher temperatures should be limited to less than 48 hours. Such higher temperatures may present the risk that a small percentage of the catalyst may be destroyed or otherwise rendered unsuitable for use as catalyst. If catalyst regeneration is conducted in the absence of oxygen-containing gas, for example in the presence of steam or nitrogen, higher temperatures can be used, for example up to about 500° C. With the information presented herein, skilled practitioners will be able to select adequate regeneration conditions for the used catalyst.

The following examples are intended to illustrate the invention and not to limit it, except as it is limited in the claims. All ratios and percentages are by weight, unless otherwise indicated, and all reagents are of good commercial quality unless otherwise indicated. Example 1 illustrates preparation of a catalyst used in the process of the invention. Examples 2 through 4 illustrate use of the invention to remove and destroy organic compounds in an aqueous fluid.

EXAMPLE 1

Catalyst Preparation

The desired concentration of metal oxide dopant was deposited on the carbonaceous substrate by filling the pores of the substrate with an aqueous solution of dopant precursor in a quantity sufficient to achieve the desired dopant concentration. The pore-filled catalyst was aged for 12 hours, then heated in vacuum to 180° C. overnight. Ambersorb®572 adsorbent was doped in this way using cobalt nitrate $(Co(NO_3)_2)$ as a dopant precursor such that 2 weight percent CoO was the final dopant level in the catalyst.

EXAMPLE 2

Equipment

Two adsorption columns (4 inch diameter×3 feet length glass process pipe) were arranged in a parallel configuration such that one adsorption column could be loaded with contaminated water while the other was being regenerated. The columns were fitted with Ace #80 Thread ends and Teflon™ end caps containing a 100 mesh stainless steel (SS) screen, a glass distributor plate and a retaining ring fastened with set screws. The columns were connected to 0.5 inch SS tubing which was used for all the process connecting/transfer piping. All valves were of SS construction and rated for steam service.

Other equipment included a shell and tube heat exchanger (condensing the regenerant or catalyst reactor effluent), rotameters (monitoring/controlling influent feed rates), cartridge filters, a condensate collection vessel and the catalytic destruction reactor. The catalytic destruction reactor was made from 1.0 inch diameter SS tubing, 12 inches in length with Standard Swagelok™ fittings used to connect the reactor to the remaining process piping. Catalyst was retained in the reactor with 100 mesh SS screens.

The adsorption columns, process piping and the catalytic destruction reactor were heated by heating tapes, controlled with J-type thermocouples connected to Omega™ BS5001J1 temperature controllers. Power output from the controllers to the heating tapes was controlled by Mintrol™ Temperature/Power Controllers. Steam was provided by a Sussman™ 18 lb/hr steam generator.

Procedure

One of two adsorbent columns was loaded with 1 gallon (4.4 pounds) of Ambersorb®563 adsorbent and a second column was loaded with 1 gallon (4.4 pounds) of Ambersorb®572 adsorbent. Well water contaminated from being in contact with military jet fuel JP-4 (mixture of approximately 300 aromatic and straight chain hydrocarbons) was loaded onto each adsorbent column. The contaminated water contained 3–5 parts contaminant per million parts water (ppm) of EPA-regulated BTEX (mixture of benzene, toluene, ethylbenzene and xylenes); BTEX materials represented approximately 70% of the total organic contaminants in the well water treated. The adsorption columns were loaded in a downflow mode and then the adsorbent columns were regenerated with saturated steam at 40 pounds per square inch (psig) pressure introduced at 2.2 pounds per hour while externally heating the adsorption column to 150° C. with heat tapes. Regeneration involved passing 10 bed volumes (BV) of steam at 0.25 BV/hour in a downflow mode through the loaded adsorbent column. Alternatively, the loading and regeneration cycles can be performed in a countercurrent mode. One regeneration was performed on each column followed by reloading with contaminated well water before feeding the regenerant stream to the catalytic destruction reactor.

The regenerant vapor stream from the adsorber was fed to the preheated catalytic destruction reactor (175° C.) with air introduced at 4.7 liters per minute (L/min) such that the average residence time was 0.22 seconds. The reactor had been loaded with 80 grams of Ambersorb®572 adsorbent doped with CoO (see above).

The reactor was bypassed in alternating hours of operation in order to determine the degree of destruction of BTEX materials as a function of time. Destruction was calculated as the weight of BTEX collected while the reactor was being bypassed, less the weight of BTEX collected when the regenerant was passed through the reactor (during the next hour), divided by the weight of BTEX collected while the reactor was being bypassed.

EXAMPLE 3

The adsorber containing Ambersorb®563 adsorbent was initially loaded with 3500 BVs of contaminated well water, regenerated and loaded a second time with contaminated well water at a flow rate of 1.2 gallons per minute (gpm) for 30 hours. Analysis of regenerant effluent after the first loading cycle indicated 90% recovery of BTEX materials adsorbed. The following amounts of BTEX compounds (among others not reported) were adsorbed in the second loading cycle: 9.4 g benzene, 11.3 g toluene, 3.4 g ethylbenzene and 15.1 g xylenes.

The regenerant effluent from the adsorber was fed to the catalyst reactor upon which a 20° C. exotherm occurred (reaction temperature increased to 195° C.). Analysis of the condensed effluent from the catalytic reactor indicated 98% reduction of total BTEX compounds (98% reduction of benzene and toluene, 99% reduction of ethylbenzene and xylenes) when compared to the unoxidized condensed stream for the first 2 to 4 hours of operation. The reduction of total BTEX compounds was about 80% after about 8 hours operation.

EXAMPLE 4

The adsorber containing Ambersorb®572 adsorbent was initially loaded with 5200 BVs of contaminated well water, regenerated and loaded a second time with contaminated well water at a flow rate of 1.2 gpm for 14 hours. Analysis of regenerant effluent after the first loading cycle indicated 94% recovery of BTEX materials adsorbed. The following amounts of BTEX compounds (among others not reported) were adsorbed in the second loading cycle: 7.6 g benzene, 11.0 g toluene, 3.0 g ethylbenzene and 13.6 g xylenes.

The regenerant effluent from this adsorber was fed to the catalyst reactor upon which a 20° C. exotherm occurred (reaction temperature increased to 195° C.). Analysis of the condensed effluent from the catalytic reactor indicated >99% reduction of total BTEX compounds (99.6+% reduction of benzene and toluene, 99.9% reduction of ethylbenzene and xylenes) when compared to the unoxidized condensed stream for the first 2 to 4 hours of operation. The reduction of total BTEX compounds was about 60% after about 6 hours operation.

We claim:

1. A process for the destruction of hydrocarbon compounds which comprises:
   (a) removing hydrocarbon compounds from an adsorbent containing hydrocarbon compounds adsorbed thereon by passing a carrier over the adsorbent and transporting the hydrocarbon compounds out of the adsorbent as a stream; and
   (b) oxidizing the hydrocarbon compounds by passing the stream through one or more reactor vessels and contacting the stream with a catalyst in the presence of excess oxygen, air, or mixtures of steam with either air or oxygen at a temperature between about 150° and about 250° C., wherein the catalyst is comprised of a carbonaceous pyrolyzed resinous polymer having a macropore size of at least 500 angstroms in average diameter, a mesopore size in the range from about 20 angstroms to about 500 angstroms in average diameter, and a micropore size of less than 20 angstroms in average diameter, wherein the macropores have a volume of at least about 0.10 ml/g, the mesopores have a volume in the range from about 0.05 ml/g to about 0.30 ml/g, and the micropores have a volume in the range from about 0.10 ml/g to about 0.40 ml/g, to achieve complete oxidation of the hydrocarbon compounds, wherein the catalyst is doped with a compound selected from the group consisting of metal oxides, metal oxyhalides, precursor metal salts which form, by decomposition or hydrolysis, metal oxide and metal oxyhalide, and mixtures thereof, and wherein the metal of the metal oxides, metal oxyhalides and precursor metal salts is selected from the group consisting of scandium, titanium, vanadium, chromium, manganese, iron, cobalt, nickel, copper, zinc, lead, niobium, zirconium, molybdenum and mixtures thereof.

2. The process of claim 1 wherein the adsorbent is activated carbon, alumina, silica, zeolite, aluminosilicate, organic polymeric adsorbent or carbonaceous adsorbent.

3. The process of claim 1 wherein the carrier is steam, polar organic solvent, air, nitrogen, carbon dioxide, supercritical fluid or inert gas.

4. The process of claim 1 wherein the catalyst has a specific area in the range from about 100 $m^2/g$ to about 2000 $m^2/g$.

5. The process of claim 1 wherein the catalyst has a specific area in the range from about 600 $m^2/g$ to about 900 $m^2/g$.

6. A process for the destruction of hydrocarbon compounds which comprises:
   (a) an adsorption step wherein a fluid stream is passed through one or more adsorbents to remove hydrocarbon compounds from the fluid stream;
   (b) a regeneration step wherein the hydrocarbon compounds are removed from the adsorbent by passing a carrier over the adsorbent and transporting the hydrocarbon compounds out of the adsorbent as a hydrocarbon-rich stream; and
   (c) an oxidative destruction step comprising passing the hydrocarbon-rich stream through one or more reactor vessels and contacting the hydrocarbon-rich stream with a catalyst in the presence of excess oxygen, air, or mixtures of steam with either air or oxygen at a temperature between about 150° and about 250° C., wherein the catalyst is comprised of a carbonaceous pyrolyzed resinous polymer having a macropore size of at least 500 angstroms in average diameter, a mesopore size in the range from about 20 angstroms to about 500 angstroms in average diameter, and a micropore size of less than 20 angstroms in average diameter, wherein the macropores have a volume of at least about 0.10 ml/g, the mesopores have a volume in the range from about 0.05 ml/g to about 0.30 ml/g, and the micropores have a volume in the range from about 0.10 ml/g to about 0.40 ml/g, to achieve complete oxidation of the organic compounds, wherein the catalyst is doped with a compound selected from the group consisting of metal oxides, metal oxyhalides, precursor metal salts which form, by decomposition or hydrolysis, metal oxide and metal oxyhalide, and mixtures thereof, and wherein the metal of the metal oxides, metal oxyhalides and precursor metal salts is selected from the group consisting of scandium, titanium, vanadium, chromium, manganese, iron, cobalt, nickel, copper, zinc, lead, niobium, zirconium, molybdenum and mixtures thereof.

7. The process of claim 6 wherein the fluid stream in step (a) is substantially an aqueous solution.

* * * * *

UNITED STATES PATENT AND TRADEMARK OFFICE
CERTIFICATE OF CORRECTION

PATENT NO. : 5,460,792
DATED : October 24, 1995
INVENTOR(S) : Bruce M. Rosenbaum, et al It is certified that error appears in the above-identified patent and that said Letters Patent is hereby corrected as shown below:

On the cover page, Inventor Section, change "Bruce M. Rosenbaum, Ambler, PA." to

- Bruce M. Rosenbaum, Ambler; William Harry Brendley, Hatboro; Stephen Gerard Maroldo, Harleysville; Deborah Ann Plantz, Langhorne, all of PA. -

Signed and Sealed this

Sixteenth Day of December, 1997

Attest:

BRUCE LEHMAN

Attesting Officer

Commissioner of Patents and Trademarks